Patented July 16, 1929.

1,720,992

UNITED STATES PATENT OFFICE.

GERALD R. BARRETT, OF WOBURN, MASSACHUSETTS, ASSIGNOR TO MERRIMAC CHEMICAL COMPANY, OF WOBURN, MASSACHUSETTS, A CORPORATION OF MASSACHUSETTS.

STABILIZED NITROCELLULOSE COMPOSITION.

No Drawing. Application filed November 21, 1927. Serial No. 234,909.

This invention relates to nitrocellulose compositions containing vegetable oils, or oxidizable resins, or both, particularly lacquers, stabilized by the addition of hydroquinone or an organic amino compound.

It is well known that films produced from nitrocellulose compositions which contain vegetable oils or oxidizable resins, or both, tend to lose their flexibility and adhesion and become brittle with age. The brittleness of such nitrocellulose compositions seems to be caused by the oxidation of the vegetable oils and resins contained in the composition.

I have found that the development of brittleness and lack of flexibility in nitrocellulose films containing vegetable oils and/or resin may be greatly retarded or prevented by the presence of hydroquinone or an organic amino compound, for example, diphenylamine or the resinous condensation product of acetaldehyde and alpha-naphthylamine. These substances act as antioxidants tending to inhibit the oxidation of the vegetable oil and resin. The plasticizing action of the vegetable oils used in connection with nitrocellulose is rendered more permanent and the development of rancidity of the vegetable oils is inhibited over long periods of time. This is particularly true of nitrocellulose compositions containing castor oil, which are used in the manufacture of artificial leather.

I have made quantitative experiments with nitrocellulose-resin mixtures to determine the gain in weight of films as they aged with and without antioxidant and have found that much of the brittleness of nitrocellulose-resin mixtures on aging is associated with the oxidation of the resin involving a gain in weight of the film. In the presence of an antioxidant such as hydroquinone, diphenylamine or the resinous condensation product of acetaldehyde and alpha-naphthylamine, nitrocellulose-resin films were found to be stabilized against the action of oxygen and retained much of the flexibility and adhesion which characterize such films when they are first prepared. The stabilizing effect is most noticeable in the case of the more oxidizable resins such as rosin glycerol ester ("ester gum") and elemi. In the case of shellac-nitrocellulose mixtures, addition of an antioxidant produces no very evident modification of the film properties with age, since shellac is only slightly susceptible to oxidation.

The antioxidant may be used in varying proportions. For example, hydroquinone has been found to be effective in a concentration as low as $\frac{1}{1,000}$ of the oxidizable substance. More permanent stabilization was obtained by using somewhat higher proportions of the antioxidant and the preferred concentration is from one-half to one percent of the antioxidant calculated on the weight of the resin and/or oil present in the film. Of course, even higher percentages of the antioxidant may be used if desired.

The antioxidant is effective in all classes of nitrocellulose compositions which contain a vegetable oil, resin, or both, whether or not they contain other substances such as solvents, plasticizers, pigments, etc., which are often added to such compositions. I have found that the antioxidant is most effective in the absence of actinic rays, which accelerate enormously the oxidative effects of atmospheric oxygen. In the case of pigmented lacquers where the pigment absorbs the active rays and confines their action to the surface layers, addition of antioxidants is of particular value.

I claim:—

1. A nitrocellulose composition containing a vegetable oil and hydroquinone.

2. A nitrocellulose composition containing a vegetable oil, an oxidizable resin, and hydroquinone.

3. A nitrocellulose composition containing a vegetable oil and hydroquinone in a concentration of about .01–1 percent of the vegetable oil.

4. A nitrocellulose composition containing a vegetable oil, an oxidizable resin, and hydroquinone in a concentration of about .01–1 percent of the vegetable oil and resin.

5. A nitrocellulose composition containing a vegetable oil and hydroquinone in a concentration of about one-half to one percent of the vegetable oil.

6. A nitrocellulose composition containing a vegetable oil, an oxidizable resin, and hydroquinone in a concentration of about one-half to one percent of the vegetable oil and resin.

7. A nitrocellulose lacquer containing a vegetable oil, pigment and hydroquinone.

8. A nitrocellulose lacquer containing a vegetable oil, resin, pigment and hydroquinone.

9. A nitrocellulose lacquer containing a vegetable oil, pigment and hydroquinone in a concentration of about one-half to one percent of the vegetable oil.

10. A nitrocellulose lacquer containing a vegetable oil, resin, pigment and hydroquinone in a concentration of about one-half to one percent of the vegetable oil and resin.

11. A nitrocellulose lacquer containing castor oil, resin, pigment and hydroquinone.

12. A nitrocellulose lacquer containing castor oil, resin, pigment and hydroquinone in a concentration of about one-half to one percent of the castor oil and resin.

13. A nitrocellulose composition containing an oxidizable resin and hydroquinone.

14. A nitrocellulose composition containing an oxidizable resin and hydroquinone in a concentration of about .01% to 1% of the oxidizable resin.

15. A nitrocellulose composition containing an oxidizable resin and hydroquinone in a concentration of about ½% to 1% of the oxidizable resin.

16. A nitrocellulose lacquer containing an oxidizable resin, pigment and hydroquinone.

17. A nitrocellulose lacquer containing an oxidizable resin, pigment and hydroquinone in a concentration of about ½% to 1% of the oxidizable resin.

18. A nitrocellulose composition containing rosin glycerol ester and hydroquinone.

19. A nitrocellulose composition containing a vegetable oil, rosin glycerol ester and hydroquinone.

20. A nitrocellulose composition containing castor oil, rosin glycerol ester and hydroquinone in a concentration of about .01–1 percent of the castor oil and rosin glycerol ester.

In testimony whereof, I affix my signature.

GERALD R. BARRETT.